Dec. 4, 1951 W. A. PLEDGER 2,577,150
KITCHEN STOVE VENTILATOR

Filed Jan. 27, 1947 2 SHEETS—SHEET 1

INVENTOR.
WILLIAM A. PLEDGER
BY Alexander Riaboff
ATTORNEY

Dec. 4, 1951 W. A. PLEDGER 2,577,150
KITCHEN STOVE VENTILATOR
Filed Jan. 27, 1947 2 SHEETS—SHEET 2
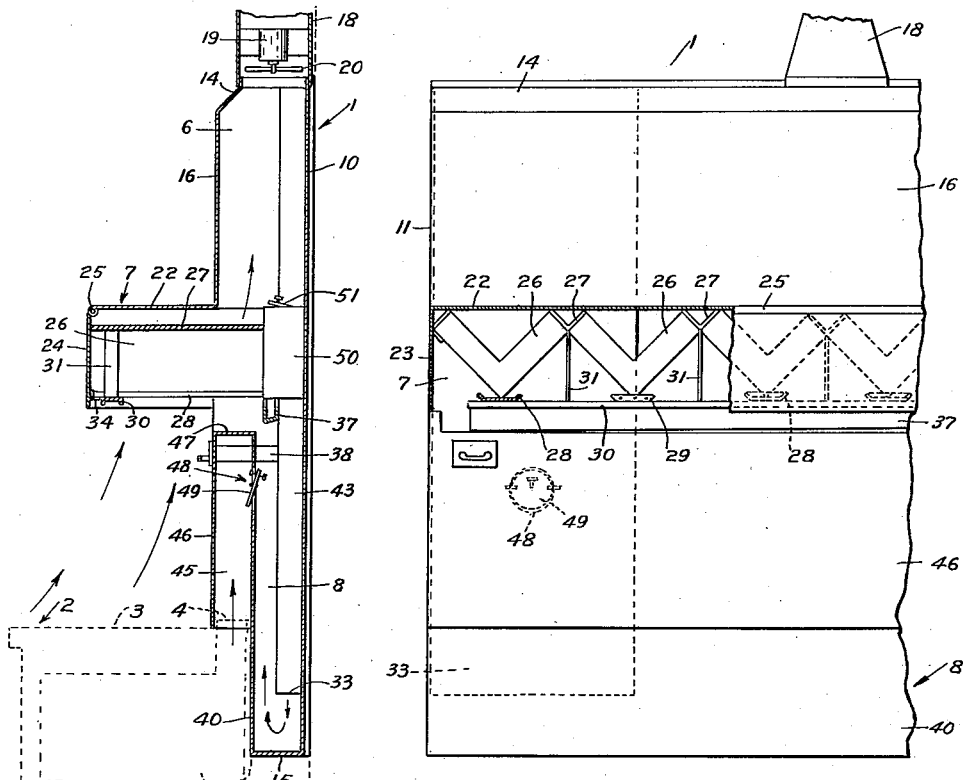
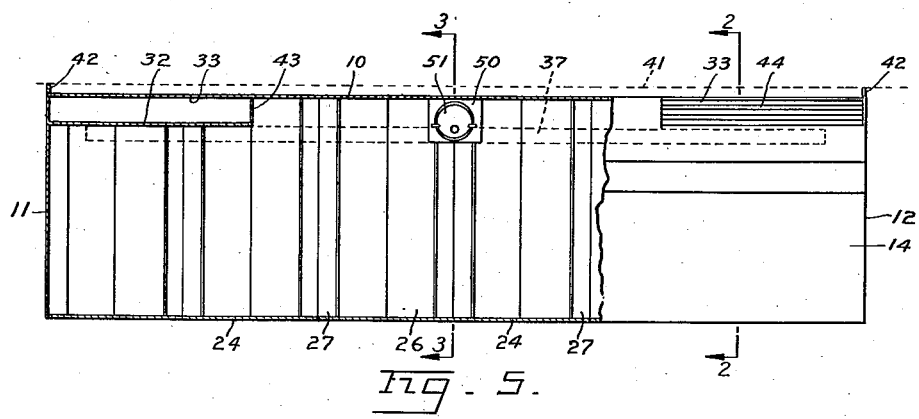
INVENTOR.
WILLIAM A. PLEDGER
BY Alexander Riaboff
ATTORNEY

Patented Dec. 4, 1951

2,577,150

UNITED STATES PATENT OFFICE 2,577,150

KITCHEN STOVE VENTILATOR

William A. Pledger, San Francisco, Calif.

Application January 27, 1947, Serial No. 724,504

2 Claims. (Cl. 126—299)

This invention relates to a kitchen stove ventilator.

The object of this invention is to provide a kitchen stove ventilator for eliminating kitchen odors, hot air and products of combustion generated by the stove.

Another object of my invention is to provide means for condensing grease and oil from the air drawn from said kitchen so as to discharge into the atmosphere odorless clean air devoid of grease and oil.

Another object of my invention is to provide a device which is closely related to the ventilating devices described in my co-pending patent applications: Serial Number 620,035 filed October 3, 1945 now Patent 2,481,341, September 6, 1949, and Serial Number 694,566 filed September 3, 1946, now Patent 2,535,863, December 26, 1950; but in the present device the filters are exposed toward the cooking surface of the stove and are located at the very entrance into said device, thus precluding settling and accumulation of grease and oil on any part thereof but the filters, wherefrom said grease and oil is directed by special troughs into a container.

Another object of this invention is to provide automatic dampers in said device by which an open path for gases, hot air and fumes is maintained when the forced draft is inoperative.

Other objects and advantages will appear as the specification proceeds and the particular features of the invention will be specifically pointed out in the appended claims.

My invention is illustrated in the accompanying drawings in which

Fig. 3 is a vertical cross-section through the device taken along the line 3—3 of Fig. 5;

Fig. 4 is a front elevation of the ventilator, a portion thereof being broken away to disclose the inner structure;

Fig. 5 is a plan view of the device some parts being shown in section; and

Fig. 6 is a cross-section of the end of an oil and grease collecting trough.

Figure 1:
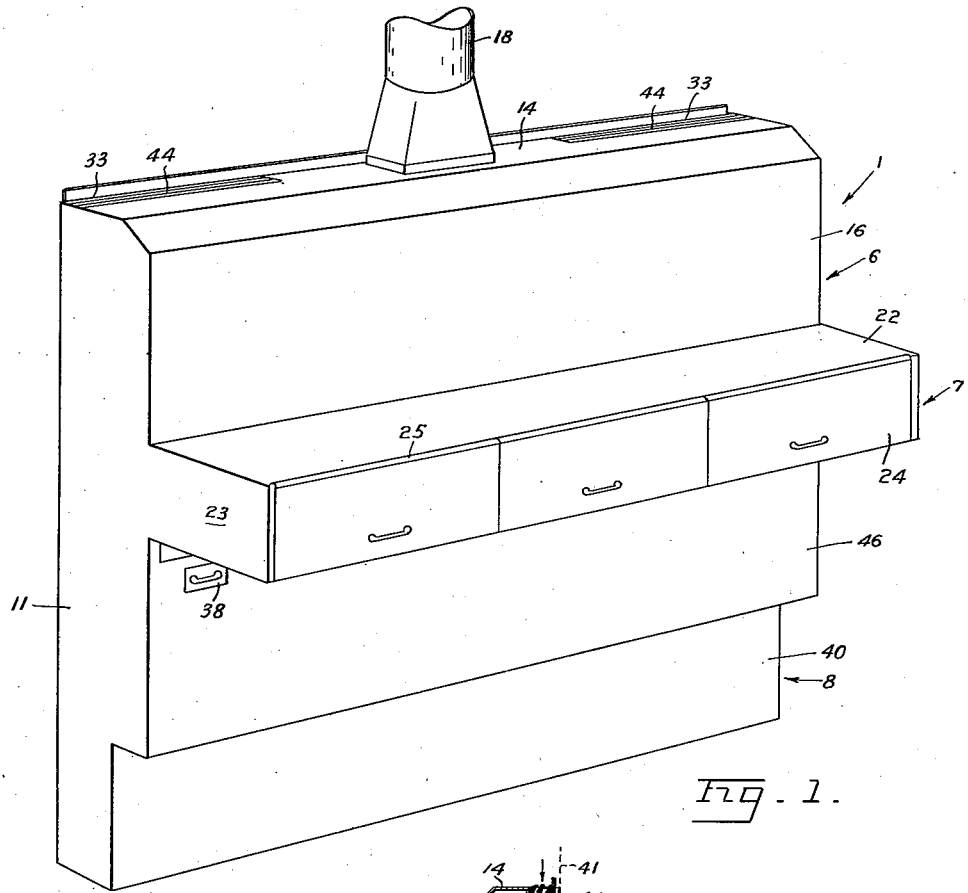
Fig. 1 is a perspective view of the kitchen stove ventilator.
Figure 2:
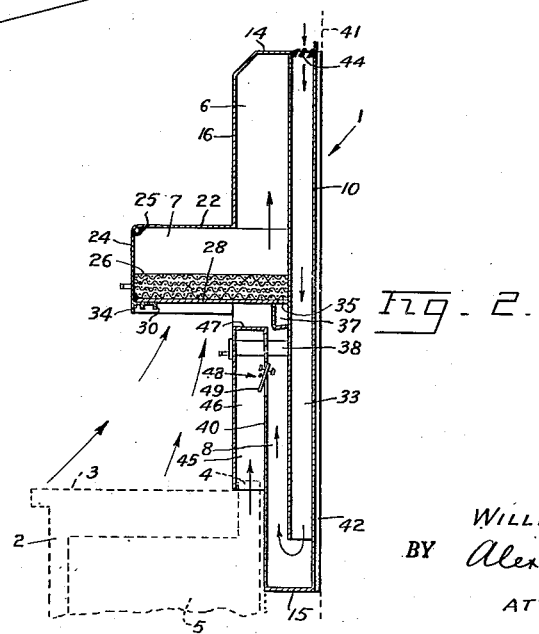
Fig. 2 is a vertical cross-section through the device taken along the line 2—2 of Fig. 5.

In general, the kitchen stove ventilator consists of a box-like structure, extending the length of the stove and occupying the space back of the stove so as to separate the latter from the wall against which the same is usually placed thereby minimizing fire hazard. The ventilator extends upwardly above the stove and forwardly over the stove a certain distance and has a plurality of grease and oil filters therein which are located in the portion of the ventilator extending over the stove. The filters are so arranged in said ventilator that they are exposed to the cooking surface of the stove. The ventilator has a forced draft, by which hot air and products of combustion generated by the stove are forced to pass through said filters. Said forced draft also draws all the fumes and products of combustion from the cooking surface directly through the filters, where grease, oil and fumes are condensed from the air passing therethrough, passing clean air into atmosphere. The filters being directly exposed to the cooking surface, condense grease, oil and fumes from the air before the same gets in contact with any other part of the ventilator, thus keeping the same clean. The ventilator also has means for drawing in air from above the stove and for directing the same toward the bottom of the ventilator and mixing it with the fumes and products of combustion of the stove thereby lowering the temperature of the air passing through the filters, hence increasing the condensation rate of the filters, and at the same time eliminating hot air from the kitchen.

In detail, the kitchen stove ventilator, generally indicated at 1, is shown in the drawings as adapted to a gas cooking stove 2 having a cooking surface 3, and an oven flue 4, through which products of combustion, fumes and odors are discharged from the oven 5 in said stove.

The ventilator 1 is preferably made out of sheet metal and comprises an elongated box-like structure extending above the cooking surface 3 and below the same, behind said stove, substantially the length thereof.

The ventilator 1 consists of an upper chamber 6, a filter chamber 7 and a lower chamber 8. The upper chamber 6 is formed by a back wall 10 and side walls 11 and 12, all extending from a top 14 of said chamber down to a bottom 15 of said lower chamber, and by a front wall 16. A smoke stack 18 is provided in the middle of the top 14, which stack has an electric motor 19 and a fan 20 inside thereof to create forced draft in the ventilator 1.

The filter chamber 7 is located between the upper chamber 6 and the lower chamber 8 and separates the same. The chamber 7 projects forwardly from the upper chamber and extends above the cooking surface 3 a certain distance. The latter chamber is formed by a top 22, sides 23 extending from the side walls 11 and 12, and has its front normally closed by a plurality of doors 24 hinged to the top 22 at 25. The bottom of the chamber 7 is open to admit fumes and hot air emanating from the cooking surface 3.

The chamber 7 contains a plurality of V-shaped filters 26 which are retained in their places by angle irons 27 welded or otherwise secured to the top 22, and by the troughs 28 on which the filters rest. The troughs 28 are slightly inclined downwardly toward the back wall 10 and have their front ends closed by removable plates 29 and supported by a channel iron 30, which is suspended on strips 31 secured to the lower corners of the angle irons 27. The rear ends of said troughs are secured by welding, or otherwise, to the back wall 10, or to front walls 32 of the passages 33, hereinafter described in detail, depending upon location of the particular angle irons 27. Each door has a lip 34 formed on the back side thereof near the lower end, which lip springs under said troughs 28, thereby retaining the door in closed position.

Oil and grease condensed from the air passing through the filters 26 flows downwardly into the troughs 28 and down the same toward the back wall 10. Each trough 28 has an opening 35 in the bottom thereof under which is located an inclined drain 37 extending substantially the length of the condenser. Oil and grease flow along said drain and therefrom into a removable tank 38 which is removed from time to time for the purpose of emptying the same.

The lower chamber 8 is located under the filter chamber 7 and is formed by the back wall 10, side walls 11 and 12, bottom 15 and a forward partition 40 which extends from the bottom 15 upwardly and terminates in close proximity to the troughs 28. The chamber 8 is arranged back of the stove 2 and extends downwardly a considerable distance below the cooking surface 3. The purpose of this arrangement is to separate the hot stove from the building wall 41 against which the same is placed and thereby minimize fire hazard. The back wall 10 is formed with two flanges 42 located on the sides thereof, which flanges keep the back wall 10 in spaced relation with the building wall 41 thus further minimizing said fire hazard.

The ventilator 1 is provided with two passages 33 located at the side walls 11 and 12 and formed by said back wall 10, front walls 32 and sides 43. The passages 33 extend from the top 14 downwardly through the upper chamber 6, filter chamber 7 and into the lower chamber 8 wherein the same terminate in close proximity to the bottom 15. The passages 33 ventilate the kitchen where the ventilator is located by conducting the air from above the ventilator into the lower chamber 8, and thereby keeping the same considerably cooler than the stove 2. Furthermore, when said air is mixed up with hot fumes and products of combustion of said stove, the resulting mixture has comparatively lower temperature than said fumes and products of combustion thus facilitating condensing of oil and grease therefrom. The amount of air drawn through said passages may be regulated by louvers 44 arranged at the top thereof. The drawings show a flue duct 45 for conducting fumes and products of combustion from the oven 5. The flue duct 45 is formed by a front 46, the forward partition 40 of the lower chamber and the side walls 11 and 12 and is closed by the top 47. The flue duct communicates with the lower chamber 8 through one or more automatic safety dampers 48 which may be of any standard form, having an adjustably balanced closure disk 49 which is normally open. The automatic safety damper 48 keeps an open path for fumes and products of combustion when the forced draft is inoperative and partially closes the path when the forced draft is in operation depending upon the draft and the flow of fumes and products of combustion from the oven 5.

A by-pass 50 with an automatic safety damper 51 is arranged in the filter chamber 7 under the smoke stack 18 between the filters 26 and the back wall 10. The said by-pass connects the lower chamber 8 with the upper chamber 6 and provides an open path for fumes and products of combustion when the forced draft is inoperative. The damper 51 automatically closes when the forced draft is operated, thus forcing fumes and products of combustion to pass through the filters 26.

The electric motor 19 and the fan 20 create a forced draft in the ventilator 1 which draws fumes, products of combustion and hot air from the cooking surface 3 of the gas stove 2 directly to the filters 26, where the same are mixed with air drawn from above said ventilator through the passages 33 down to the bottom of the lower chamber 8 and up to said filters. Said forced draft also draws fumes from the oven 5 into the flue duct 45 and therefrom through the automatic dampers 48 into the lower chamber 8 and to the filters 26. The latter condense oil and grease from the air passing therethrough and discharge into the upper chamber 6, and therefrom into the smoke stack 18, clean and odorless air.

Instead of the flue duct 45 of the type shown in the drawings, a pipe leading from said oven flue 4 upwardly and communicating with the lower chamber 8 by means of the automatic safety damper 48 may be arranged.

Having thus described my invention, I claim:

1. The combination of a cooking stove having a cooking surface and an oven, with a ventilator comprising a filter chamber extending over and above the cooking surface of the stove, said filter chamber having an open bottom; a filter in said chamber for condensing grease and oil from the air passing therethrough the bottom surface of which filter is exposed to said cooking surface; a stack; an upper chamber connecting said filter chamber with the stack; a blower for drawing fumes, products of combustion and hot air from said cooking surface and said oven through said filter, into said filter chamber, upper chamber and into said stack; means forming an air passage leading from the top of the ventilator downwardly toward the stove and upwardly to the filter; means forming a by-pass in the filter chamber; and an automatic damper in said by-pass for keeping the latter normally open and for closing said by-pass when the blower is in operation.

2. The combination of a stove having a cooking surface with a ventilator comprising a plurality of V-shaped filters located over said cooking surface and directly exposed thereto; a blower for drawing fumes and hot air from the cooking surface through said filters; said filters being adapted to condense vapor, grease and oil from the air passing therethrough; a plurality of troughs for collecting vapor, grease and oil condensed by the filters, each of said troughs being located at the lowermost portion of each of said filters; and a drain for collecting condensates from said troughs.

WILLIAM A. PLEDGER.

(References on following page)

REFERENCES CITED

The following references are of record in the file of this patent:

UNITED STATES PATENTS

| Number | Name | Date |
|---|---|---|
| Re. 22,228 | Peterson | Dec. 1, 1942 |
| 607,976 | Amos | July 26, 1898 |
| 1,377,694 | Koehler | May 10, 1910 |
| 1,584,707 | Hedeen | May 11, 1926 |
| 1,671,524 | Gerdes | May 29, 1928 |
| 1,794,908 | Kreft | Mar. 3, 1931 |
| 1,841,314 | Grunwaldt | Jan. 12, 1932 |
| 2,112,041 | Miller | Mar. 22, 1938 |
| 1,776,777 | Bragstad | Sept. 30, 1930 |
| 2,369,375 | Sonntag | Feb. 13, 1945 |
| 2,375,913 | Gilbert | May 15, 1945 |
| 2,392,038 | Gaylord | Jan. 1, 1946 |
| 2,398,508 | Shoemaker | Apr. 16, 1946 |
| 2,481,341 | Pledger | Sept. 6, 1949 |
| 2,494,146 | Spanos | Jan. 10, 1950 |

FOREIGN PATENTS

| Number | Country | Date |
|---|---|---|
| 370,159 | Great Britain | Apr. 7, 1932 |
| 370,160 | Great Britain | Apr. 7, 1932 |